United States Patent
McGloin et al.

(10) Patent No.: US 10,977,156 B2
(45) Date of Patent: Apr. 13, 2021

(54) LINKING SOURCE CODE WITH COMPLIANCE REQUIREMENTS

(71) Applicants: International Business Machines Corporation, Armonk, NY (US); University of Limerick, Limerick (IE)

(72) Inventors: Mark McGloin, Dublin (IE); Olgierd Pieczul, Dublin (IE); Bashar Nuseibeh, Castletroy (IE); Sorren Hanvey, Castletroy (IE); Jesus Garcia Galan, Castletroy (IE)

(73) Assignees: International Business Machines Corporation, Armonk, NY (US); University of Limerick, Limerick (IE)

( * ) Notice: Subject to any disclaimer, the term of this patent is extended or adjusted under 35 U.S.C. 154(b) by 0 days.

(21) Appl. No.: 16/156,116

(22) Filed: Oct. 10, 2018

(65) Prior Publication Data

US 2020/0117573 A1    Apr. 16, 2020

(51) Int. Cl.
*G06F 11/36* (2006.01)
*G06F 8/77* (2018.01)
*G06F 8/10* (2018.01)

(52) U.S. Cl.
CPC ............ *G06F 11/3608* (2013.01); *G06F 8/10* (2013.01); *G06F 8/77* (2013.01)

(58) Field of Classification Search
CPC ........... G06F 11/3608; G06F 8/10; G06F 8/77
See application file for complete search history.

(56) References Cited

U.S. PATENT DOCUMENTS

| | | | |
|---|---|---|---|
| 7,640,532 B2 * | 12/2009 | Jain ...................... | G06Q 10/06 717/102 |
| 7,657,542 B2 * | 2/2010 | Sundararajan ............ | G06F 8/10 717/103 |
| 7,840,944 B2 * | 11/2010 | Brunswig ........... | G06F 11/3688 717/124 |
| 8,028,269 B2 | 9/2011 | Bhatia et al. | |
| 8,370,796 B2 * | 2/2013 | Hahn .................. | G06F 11/3692 717/106 |
| 8,479,161 B2 * | 7/2013 | Weigert .................... | G06F 8/75 717/124 |
| 8,584,079 B2 * | 11/2013 | Yassin ................. | G06F 11/3672 717/101 |

(Continued)

OTHER PUBLICATIONS

Anh Tuan Nguyen et al., "A Topic-based Approach for Narrowing the Search Space of Buggy Files from a Bug Report", 2011, IEEE (Year: 2011).*

(Continued)

*Primary Examiner* — Douglas M Slachta
(74) *Attorney, Agent, or Firm* — Schmeiser, Olsen & Watts, LLP; Nicholas L. Cadmus

(57) ABSTRACT

Concepts for linking source code with compliance requirements are presented. One example comprises analyzing a set of compliance requirements to identify one or more compliance topics. The example further comprises determining keywords for the identified one or more compliance topics. An item of source code is then analyzed to identify occurrences of the keywords in the source code. Mapping information representing a relationship between the item of source code and the compliance requirements is then generated based on the identified occurrence of the keywords.

15 Claims, 8 Drawing Sheets

(56) References Cited

U.S. PATENT DOCUMENTS

| | | | | |
|---|---|---|---|---|
| 8,910,120 | B2* | 12/2014 | Srinivasa | G06F 16/00 |
| | | | | 717/124 |
| 9,158,655 | B2* | 10/2015 | Wadhwani | G06Q 10/06395 |
| 9,280,450 | B2 | 3/2016 | Wong et al. | |
| 9,448,792 | B2* | 9/2016 | Narasimhan | G06F 11/008 |
| 9,916,228 | B1* | 3/2018 | Elgarat | G06F 11/3676 |
| 10,489,151 | B1* | 11/2019 | Katan | G06F 8/75 |
| 2005/0125769 | A1* | 6/2005 | McGovern | G06F 8/10 |
| | | | | 717/102 |
| 2006/0048093 | A1* | 3/2006 | Jain | G06Q 10/06 |
| | | | | 717/104 |
| 2007/0006041 | A1* | 1/2007 | Brunswig | G06F 11/3688 |
| | | | | 714/38.14 |
| 2008/0222631 | A1 | 9/2008 | Bhatia et al. | |
| 2008/0263505 | A1* | 10/2008 | StClair | G06F 8/10 |
| | | | | 717/101 |
| 2009/0125283 | A1 | 5/2009 | Conover | |
| 2009/0241165 | A1* | 9/2009 | Tyree | G06Q 10/06 |
| | | | | 726/1 |
| 2009/0307213 | A1* | 12/2009 | Deng | G06F 16/35 |
| 2010/0058291 | A1* | 3/2010 | Hahn | G06F 11/302 |
| | | | | 717/113 |
| 2011/0137987 | A1* | 6/2011 | Tyree | G06Q 10/0639 |
| | | | | 709/204 |
| 2013/0117725 | A1* | 5/2013 | Bnayahu | G06F 8/30 |
| | | | | 717/101 |
| 2014/0143750 | A1* | 5/2014 | Gangadharan | G06F 8/36 |
| | | | | 717/102 |
| 2015/0193091 | A1* | 7/2015 | Cragun | G06F 11/3668 |
| | | | | 715/763 |
| 2016/0188436 | A1 | 6/2016 | Wong et al. | |
| 2016/0239546 | A1* | 8/2016 | Cuomo | G06F 16/248 |
| 2016/0283360 | A1* | 9/2016 | Allen | G06F 11/3688 |
| 2016/0292066 | A1 | 10/2016 | Stevens et al. | |
| 2017/0192959 | A1* | 7/2017 | Lee | G06F 16/313 |
| 2017/0269905 | A1* | 9/2017 | Wu | G06F 8/10 |
| 2017/0364551 | A1* | 12/2017 | Averbuch | G06F 17/18 |
| 2018/0032331 | A1* | 2/2018 | Desai | G06F 8/77 |
| 2018/0275989 | A1* | 9/2018 | Kakkad | G06F 11/3409 |
| 2020/0097390 | A1* | 3/2020 | Gunter | G06F 11/368 |

OTHER PUBLICATIONS

Open Source Software Continuous Compliance As a Service, Dec. 13, 2017, Retrieved from Internet: URL: https://sourcecodecontrol.co/continuous-compliance/, 3 pages.

Jim Bird, Compliance As Code, Jan. 27, 2017, Retrieved from Internet: URL: https://www.oreilly.com/learning/compliance-as-code, 14 pages.

Fitzgerald et al., Continuous Software Engineering and Beyond: Trends and Challenges, Retrieved from Internet: URL: https://dl.acm.org/citation.cfm?id=2593813, 2 pages.

Rahimi et al., Evolving Requirements-To-Code Trace Links Across Versions of a Software System, Published in: Software Maintenance and Evolution (ICSME), 2016 IEEE International Conference on Date of Conference: Oct. 2-7, 2016, Retrieved from Internet: URL: http://ieeexplore.ieee.org/document/7816458/, 3 pages.

Nguyen et al., A Topic-Based Approach for Narrowing the Search Space of Buggy Files From a Bug Report, Published in: Automated Software Engineering (ASE), 2011 26th IEEE/ACM International Conference on Date of Conference: Nov. 6-10, 2011, Retrieved from Internet: URL: http://ieeexplore.ieee.org/document/6100062/, 3 pages.

U.S. Appl. No. 16/155,991, filed Oct. 10, 2018.

Murphy, Jason A. ; List of IBM Patents or Patent Applications Treated as Related; Jan. 5, 2021; 1 page.

* cited by examiner ent invention.

LINKING SOURCE CODE WITH COMPLIANCE REQUIREMENTS

TECHNICAL FIELD

The present invention relates to regulatory compliance in the field of software development, and more particularly to a method for linking source code with compliance requirements, and for identifying relevance of a source code change to compliance requirements.

BACKGROUND

Regulatory compliance is an important concern in software development. Conformance to laws and regulations increases the safety of a computer/software system and the customers, whereas non-compliance with such requirements can result in negative consequences, including reputation loss, fines and even criminal prosecution.

SUMMARY

An embodiment of the present invention relates to a method, and associated computer system and computer program product, for generating mapping information linking source code with compliance requirements. A processor of a computing system analyzes a set of compliance requirements to identify one or more compliance topics. Keywords are determined for the identified one or more compliance topics. An item of source code is identified to identify occurrences of the keywords in the source code. Mapping information representing a relationship between the item of source code and the compliance requirements is generated based on the identified occurrences of the keywords.

BRIEF DESCRIPTION OF THE DRAWINGS

Preferred embodiments of the present invention will now be described, by way of example only, with reference to the following drawings, in which.

DETAILED DESCRIPTION

Figure 1:
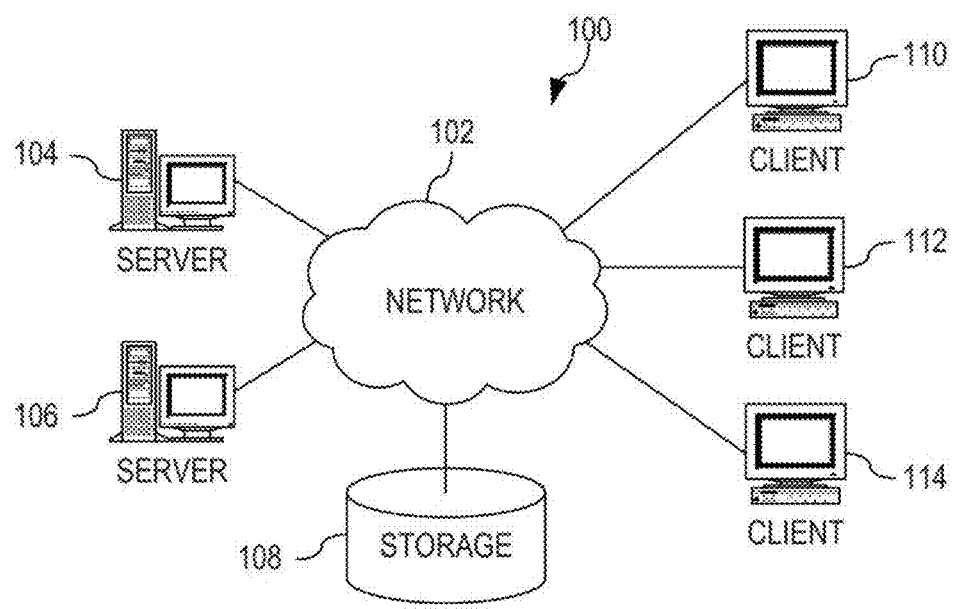
FIG. 1 depicts a pictorial representation of an exemplary distributed system, in accordance with embodiments of the present invention.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Traditional compliance approaches pose difficulties for today's fast-paced development environments. For example, large software systems typically employ a continuous delivery model, with dozens of development and deployment cycles being completed on a daily basis. With respect to meeting compliance requirements, it is practically unfeasible to review that many increments in such short cycles before deployment. Consequently, the deployment of critical parts of such a system may be significantly delayed so as to ensure compliance requirements are met. Alternatively, to avoid such deployment delay(s), the system may be deployed without ensuring compliance requirements are met, thus increasing the chances that the system is uncompliant with respect to various requirements at (or soon after) the time deployment.

Proposed is a concept for linking source code with compliance requirements. By identifying connections between source code elements (e.g. words, terms, phrases) and compliance requirements, a model (i.e. structured description) of how source code relates to the compliance requirements may be provided, which may assist in the identification of if and how source code changes are relevant to compliance requirements. A tool for detecting the impact of source code changes in a continuously delivery model with respect to compliance may therefore be provided by a proposed embodiment, which may enable a code developer to take immediate action (e.g. alter proposed code changes so as to meet compliance requirements), thus potentially speeding-up code deployment.

By way of example, proposed embodiments may identify compliance topics within compliance requirements, and may then analyze source code to identify occurrences of the topics within the source code. The identified occurrences of the topics in the source code may then be correlated with compliance topics, thereby providing a mapping of source code elements to compliance requirements, which may allow for the source code to be mapped, at any level (e.g. class, package, component), to corresponding requirements (e.g. compliance topics or tags). Each topic may be represented by the keywords or tags, and the keywords may be weighted or associated with a metric value to represent a relative importance.

Accordingly, proposed embodiments may provide a tool or mechanisms for assisting in the detection of what impact code changes in a continuous delivery model may have with respect to compliance requirements, which may help to improve an understanding of how code changes and/or elements may map to compliance requirements.

Proposed embodiments may also be configured to continuously track compliance requirements and source code, and store information linking the compliance requirements and source code. Such information may then be used to assess if proposed source code changes may be relevant to compliance requirements.

Compliance requirements may be represented using a set of keywords (e.g. tags, labels, identifiers, keys or tickets) that the keywords relate to. Such keywords may be prescribed, inferred or both. Reference to keywords refers to constructs that may be used to describe compliance requirements and which may be present or identifiable within source. Thus, a simple construct may comprise an alphanumeric character, string of alphanumeric characters or a word. More complex constructs that may be used for a keyword may comprise a plurality of keywords, such as a phrase, or expression.

Exemplary keywords may therefore comprise one or more letters, numbers, symbols, alphanumeric characters, word, or a combination thereof.

Embodiments may be thought of as identifying a mapping of an element or item of code to compliance topics (e.g. using keywords or tags), which may be achieved by analyzing source code to identify occurrences of the keywords, and the identified occurrence may be mapped to the compliance topic that the keyword relates to. By way of example, such mapping may be achieved by one or more of the following approaches: code may be marked explicitly; marked through annotation; and a description of the mapping stored separately from the source code. Accordingly, such mapping information may map code at any level. For instance, a compliance requirement may be mapped to: a specific code block; a specific code method; a specific library or component; a specific pattern (such as regular expression) and a specific comment in the code.

Proposed embodiments may therefore provide methods and systems for mapping or associating source code to compliance requirements. Information representing such mappings may then be employed for the purpose of identifying relevance of a source code change to the compliance requirements. For example, when a user proposes a change or modification to an element of source code, the mapping information may be analyzed to determine if the changed element relates to a compliance requirement. An indication of the compliance requirement may then be automatically generated and provided to the user if it is determined that the code element relates to a compliance requirement.

Proposed embodiments may therefore provide an accurate, automated and efficient method for identifying relevance of a source code change to compliance requirements. The system and method may be capable of identifying relevant compliance requirements without the user needing to knowingly complete supplementary or additional checks that may be time-consuming, inconvenient and/or complex. Further, proposed embodiments may be capable of tracking changes in compliance requirements and/or source code over time, thus enabling mapping information to be responsive and/or dynamic.

Embodiments may facilitate the efficient and effective correlation of source code to compliance requirements. Such concepts may be based on representing compliance requirements with tags or keywords that can be identified within the source code.

By way of further example, embodiments may be extensions to existing computer systems and/or code authoring systems. Such extensions may enable a computer system to provide additional compliance checks by leveraging proposed concepts. In this way, a conventional computer system or code authoring system may be upgraded by implementing or 'retro-fitting' a proposed embodiment.

Illustrative embodiments may analyze and identify links between source code elements and compliance requirements, and such concepts may cater for changes in the source code and/compliance requirements over time. Dynamic correlation concepts may therefore be provided by proposed embodiments.

Modifications and additional steps to a traditional source code authoring, creation editing or modification system may also be proposed which ma enhance the value and utility of the proposed embodiments.

Some embodiments may further include the step of, for each of the keywords, determining a weighting value representing a relative importance of the keyword. The step of generating mapping information may then be further based on the determined weighting values. In this way, the mapping information may facilitate a summary view or aggregated metric of how relevant and/or important items of codes are with respect to compliance requirements.

Embodiments may pre-process the set of compliance requirements and/or the source code to remove predetermined words and characters. In this way, irrelevant or unimportant content/information may be ignored or dismissed, thus reducing computational or resource requirements for analyzing the set of compliance requirements and/or the source code.

The compliance requirements and/or the source code may be processed in accordance with a natural language processing algorithm to identify keywords. For example, embodiments may employ known heuristics or Natural Language Processing (NLP) techniques (e.g. build a Latent Dirichlet Allocation (LDA) model) to identify tags or keywords. Embodiments may therefore employ conventional techniques for identifying keywords or tags in written content, which may facilitate simple and/or cheap implementation of embodiments, because existing algorithms or components may be employed, rather than needing to develop unique or proprietary algorithms/components).

FIG. 1 depicts a pictorial representation of an exemplary distributed system, in accordance with embodiments of the present invention. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first server 104 and a second server 106 are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments, and therefore, the particular elements shown in FIG. 1 should not be considered limiting with regard to the environments in which the illustrative embodiments of the present invention may be implemented.

Figure 2:
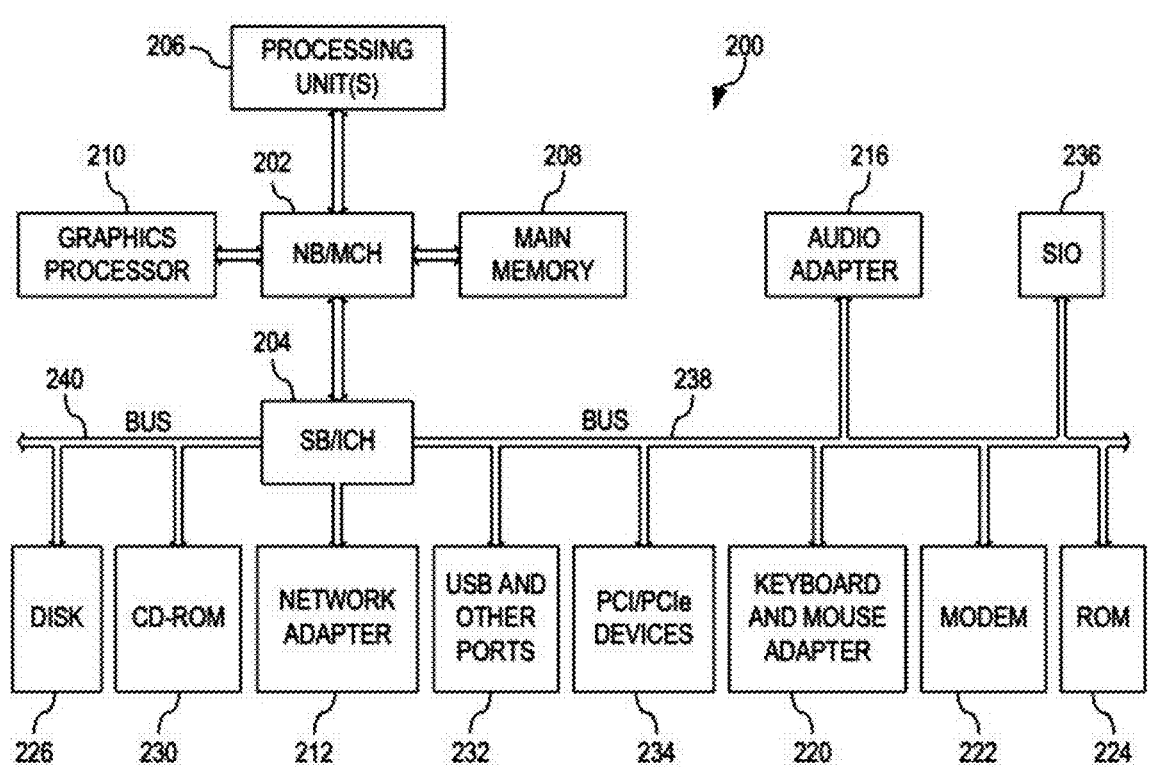
FIG. 2 is a block diagram of an example system, in accordance with embodiments of the present invention.

FIG. 2 is a block diagram of an example system 200, in accordance with embodiments of the present invention. The system 200 is an example of a computer, such as client 110 in FIG. 1, in which computer usable code or instructions implementing the processes for illustrative embodiments may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System P® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

The hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

A proposed embodiment may enhance a software coding and/or deployment system by providing mapping information representative of relevance of compliance requirements to source code. Embodiments may provide such mapping information by obtaining keywords or tags for topics of the compliance requirements, and then identifying the presence of such keywords/tags within the source code. The presence of keywords/tags and the compliance requirements they relate may then be used to generate the mapping information. In this way, when an element of the source code is modified, the generated mapping information may be used to determine if the element of source code relates to one or more compliance requirements.

Figure 3:
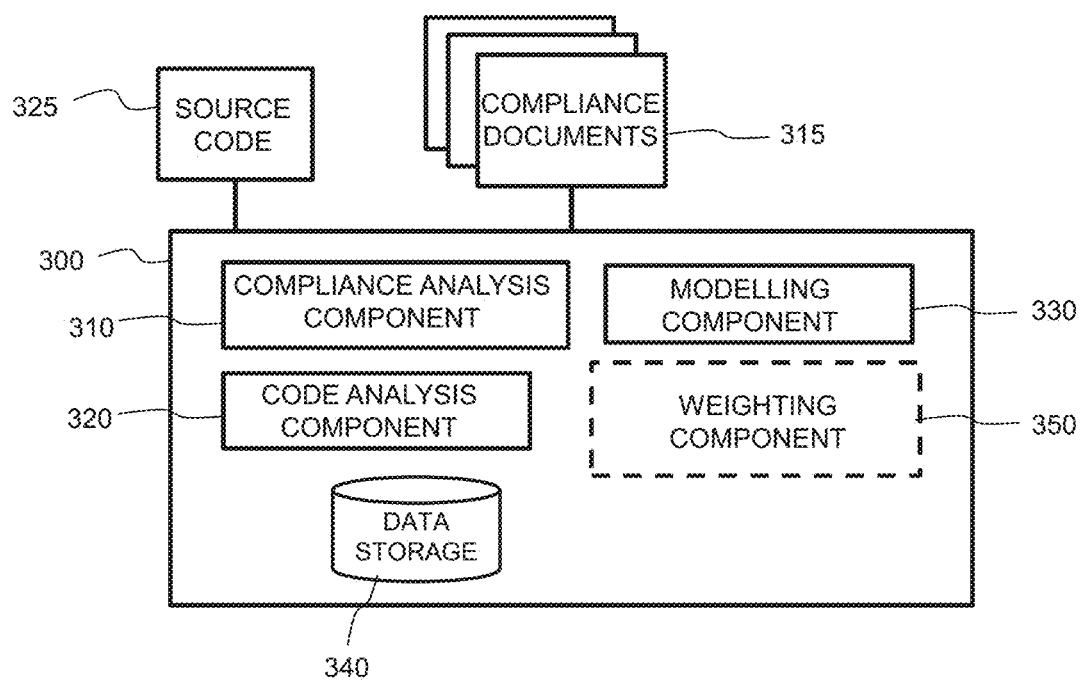
FIG. 3 is a simplified block diagram of a system 300 for generating mapping information linking source code with compliance requirements, in accordance with embodiments of the present invention.

FIG. 3 is a simplified block diagram of a system 300 for generating mapping information linking source code with compliance requirements, in accordance with embodiments of the present invention. Here, the compliance requirements are defined in a set of compliance documents 315 (e.g. digital files) that are provided to the system 300 via a suitable communication link.

The system 300 comprises a compliance analysis component 310 that is configured to analyze the compliance requirements to identify compliance topics.

In this example, the compliance analysis component 310 is configured to pre-process the compliance requirements to remove predetermined words and characters. Such pre-processing may the remove irrelevant or unimportant content/information from the compliance requirement, thereby thus reducing computation load/requirements for analyzing the compliance requirements to identify compliance topics.

In more detail, the compliance analysis component 310 of this example is configured to process the compliance requirements in accordance with known heuristics or NLP algorithms to identify topic words for the compliance requirements. The compliance analysis component is also configured to determine a frequency of occurrence of each identified topic word in the set of compliance requirements. Based on the frequency of occurrence of each identified topic word, one or more compliance topics are determined.

The compliance analysis component 310 is also configured to analyze the identified compliance topics to determine keywords for the compliance topics. Again, the compliance analysis component 310 of this example is configured to process the compliance requirements and the identified compliance topics in accordance with known heuristics or NLP algorithms to identify keywords for the compliance topics.

The system 300 also comprises a code analysis component 320 that is configured to analyze a received item of source code 325 to identify occurrences of the keywords in the source code. Here, the code analysis component 325 is configured to process the item of source code 325 in accordance with known heuristics or NLP algorithms to identify occurrences of the keywords.

A modelling component of the system 300 is configured to generate mapping information representing a relationship between the item of source code 325 and the compliance requirements based on the occurrences of the keywords identified by the code analysis component 320.

In more detail, in the example embodiment of FIG. 3, the modelling component 300 is configured to define a model entry associating an occurrence of a keyword with the compliance topic it is a keyword. Further, a distribution of each keyword in the item of source code may be determined, and a model entry defining a keyword and its associated distribution in the source code may then be defined. Such model may thus comprise entries multiple entries for each keyword.

In the embodiment of FIG. 3, the system 300 also comprises a data storage component 340 that is configured to store the generated mapping information. Subsequent use of the system 300 (e.g. in response to changes in the source code 325 and/or compliance documents 315) may then modify, update, replace or refine mapping information stored by the data storage component 340). In this way, variations in compliance requirements and/or the source code may be accounted for by modifying (e.g. updating, refining or correcting) the stored mapping information.

The system 300 may also comprise a weighting component 350 that is configured, for each of the keywords, to determine a weighting value representing a relative importance of the keyword. By way of example, the weighting component 350 may determine a frequency of occurrence of a keyword in the compliance documents, and then calculate a weighting value for that keyword based on the determined frequency of occurrence. The modelling component 330 may then be configured to generate mapping information further based on the determined weighting values. However, it is envisaged that the exemplary system 300 of FIG. 3 may not employ the weighting component 350 in some implementations, and so the weighting component 350 is depicted using dashed lines to indicate this.

Figure 4:
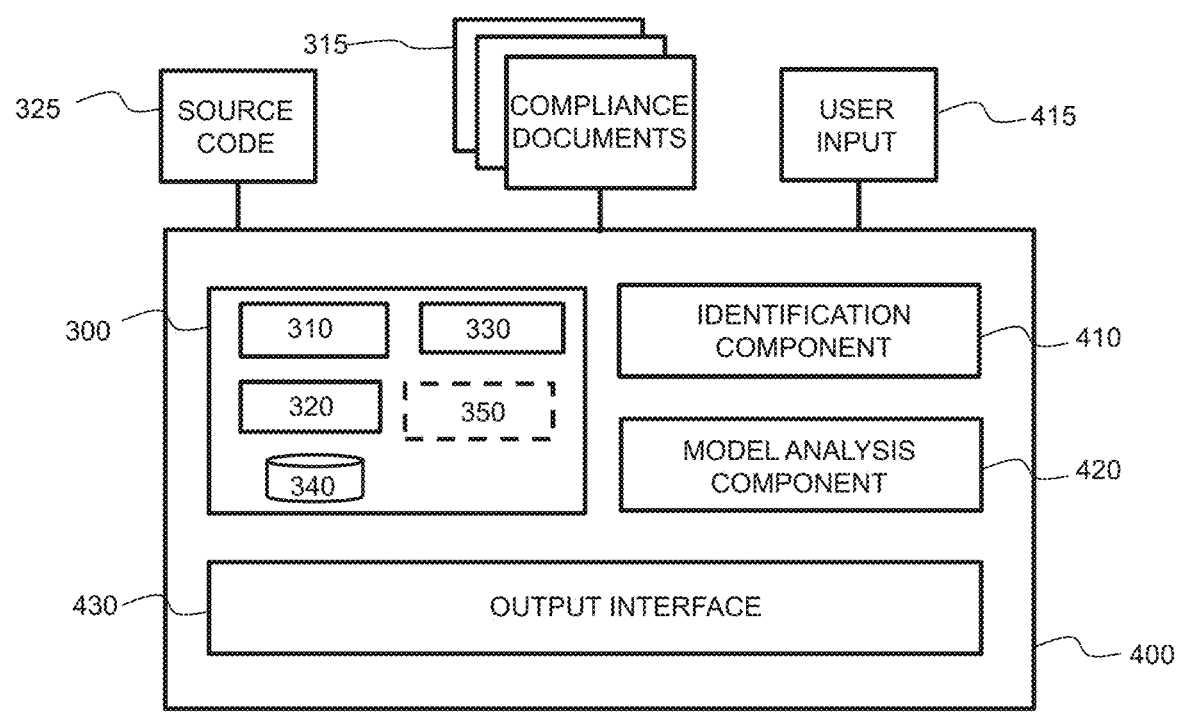
FIG. 4 is a simplified block diagram of a system for identifying relevance of a source code change to compliance requirements, in accordance with embodiments of the present invention.

Referring now to FIG. 4, which is a simplified block diagram of a system 400 for identifying relevance of a source code change to compliance requirements, in accordance with embodiments of the present invention. Here, the compliance requirements are defined in a set of compliance documents 315 (e.g. digital files) that are provided to the system 400 via a suitable communication link.

In this example, the system 400 comprises the system 300 for generating mapping information depicted in FIG. 3. Accordingly, for the compliance requirements defined by the received compliance documents 315, the system 300 is configured to generate mapping information representing a relationship between the item of source code 325 and the compliance requirements.

The system 400 also comprises an identification component 410 configured to identify a changed element of an item of source code. Here, the identification component 410 is configured to receive a user input 415 indicating a proposed change to the source code 325. Based on the user input 415, the identification component 410 determines the changed element of the source code 325.

The system 400 also comprises a model analysis component 420 that is configured to analyze the mapping information (provided by the system 300) based on the identified changed element to determine if the changed element relates to a compliance requirement. By way of example, in the example of FIG. 4, the model analysis component 420 is configured to retrieve, from the system 300, mapping information relating to the identified changed element and to then determine if the retrieved mapping information indicates that the changed element is linked/mapped to a compliance requirement.

If it is determined by the model analysis component 420 that the changed element relates to a compliance requirement, an output interface 430 of the system 400 is configured to generate an indication of the compliance requirement. In this way, the system 400 may provide a notification that a code change is associated with a compliance requirement, thus potentially enabling relevant compliance requirements to be highlighted and accounted for without the user requiring a detailed knowledge of potentially applicable compliance requirements when proposed source code changes.

By of further example, an exemplary implementation of proposed embodiments will now be detailed as follows:

Scenario Description

Consider an open source software platform for e-commerce, whose software project is hosted in publically-accessible source code resource. From there, one may have public access to the source code, resources related to the version control system, including code version history, commits, pull requests, etc., and issues from a ticketing system.

The software platform for e-commerce has to deal with credit cards information. Consequently, the platform must comply with the known PCI-DSS standard, which is the information security standard for organizations that handle branded credit cards from the major card schemes.

Resources Considered

PCI-DSS requirements—available publican)/from a standards organization's public database.

(ii) Source code of the open-source software platform—available from a publically-accessible source code resource.

(iii) Project issues—available from the ticketing system.

(iv) Project commits—available from the commits system of the publically-accessible source code resource.

Obtaining and Pre-Processing Resources

Resource (i) (PCI-DSS document) is obtained as a file. For easier processing in latter steps, a document conversion service may be employed to convert the file into plain text. Also, from the PCI document, only the section where the actual requirements are described may be considered relevant.

Resource (ii) (source code) is obtained by downloading the software project code from the publically-accessible source code resource.

Resources (iii) (project issues) and (iv) (project commits) are obtained via an Application Programming interface (API) of the publically-accessible source code resource.

Part 1—Correlating Compliance Requirements and Code to Generate Mapping Information.

Inputs—PCI-DSS requirements; source code files; and project issues.

Outputs—compliance keyword model (e.g. tags for compliance topics); correlation model between compliance requirements and files (e.g., mapping information); and correlation model between compliance requirements and files (e.g. supplementary mapping information).

Step 1—Extract Keywords from the Description of the PCI-DSS Requirements.

(a) Pre-process the PCI-DSS requirements to remove common words, stop words and non-relevant characters.

(b) Use specific heuristics, or NLP techniques (e.g., build a Latent Diriletch Allocation (LDA) model for topic modelling) to extract keywords from the requirements. Topic modelling, in particular, extracts sets of keywords (topics) and their frequency from the compliance requirements for PCI. For example, for one (e.g. 'Topic 3') of ten compliance topics using LDA on the 12 PCI-DSS requirements, the following keywords and their associated frequencies may be identified: store=0.0402963427308; user=0.0399072634694; password=0.0302430599067; database=0.0268748890127; key=0.0220824060028; application=0.0213588591785; personnel=0.020892763595; data=0.0156043350597; need=0.0142797066262; and file=0.0128010874451.

(c) Extract keywords from individual (sub)requirements. For instance, exemplary distributions of five different (sub) requirements for the first five compliance topics may be as detailed in Table 1 below:

TABLE 1

| Document | Dist Topic 1 | Dist Topic 2 | Dist Topic 3 | Dist Topic 4 | Dist Topic 5 |
|---|---|---|---|---|---|
| 1.1 | 0 | 0 | 0 | 0.67643528 | 0 |
| 1.3 | 0.74976696 | 0 | 0 | 0.24496858 | 0 |
| 3.2 | 0 | 0 | 0.99323183 | 0 | 0 |
| 3.4 | 0 | 0 | 0.9935235 | 0 | 0 |
| 3.2 | 0 | 0.96399312 | 0 | 0 | 0 |

Step 2—Extract Keywords from the Source Code Files (at a File-Level Granularity).

a. Pre-process files to remove non-relevant ones (such as images or binaries), and pre-process code files to remove words, such as keywords in the language.

b. Use specific heuristics, or NLP techniques, to extract keywords from the files. In this particular case, the aforementioned. LDA model is used to identify underlying topics related to the compliance requirements, and their respective probability distribution. For instance, exemplary results using the previously built WA model, showing 5 different topics, on four source code files may be as detailed in Table 2 below:

TABLE 2

| Document | Dist Topic 1 | Dist Topic 2 | Dist Topic 3 | Dist Topic 4 | Dist Topic 5 |
|---|---|---|---|---|---|
| DocA | 0.033334465 | 0.033337999 | 0.033340779 | 0.033340802 | 0.03334233 |
| DocB | 0.050000218 | 0.050012401 | 0.050006172 | 0.050011294 | 0.050004511 |
| DocC | 0.025001537 | 0.025002828 | 0.02500471 | 0.025003433 | 0.025001407 |
| DocD | 0.020002905 | 0.020004063 | 0.020004762 | 0.0200056 | 0.020003133 |

Step 3—Identify Files Relevant to Compliance, Depending on the Probability Distribution of the Extracted Keywords.

a. Define similarity criteria to relate files to specific compliance requirements (e.g., file A and compliance requirement B share same topics and similar probability distributions).

b. Retrieve relevant files and their related compliance requirements. For instance, an exemplary relation between file and compliance requirements, wherein the file 'FileA' is quite related to topic 3 (0.959) may be as detailed in Table 3 below.

TABLE 3

| Document | Dist Topic 1 | Dist Topic 2 | Dist Topic 3 |
|---|---|---|---|
| FileA | 0 | 0 | 0.959082538 |

Above, it has been identified (in Table 1) that requirements 3.2 and 3.4 are mainly about that Topic 3. It may thus be inferred that such requirements are quite related to the file 'FileA'.

c. Store these correlations in the Correlation model between compliance requirements and files.

4—Extract Compliance Keywords and Traces from Issues in the Ticketing System.

a. Pre-process issues to remove non-relevant words and characters.

b. Use the compliance keyword model to extract compliance topics from the issues. For instance, exemplary topic frequencies for five issues may be as detailed in Table 4 below:

TABLE 4

| Issue | Dist Topic 1 | Dist Topic 2 | Dist Topic 3 | Dist Topic 4 | Dist Topic 5 |
|---|---|---|---|---|---|
| Issue1 | 0.05000496 | 0.050015 | 0.5498661 | 0.05001465 | 0.0500154 |
| Issue2 | 0.0333378 | 0.0333393 | 0.0333375 | 0.03334016 | 0.0333413 |
| Issue3 | 0.03333597 | 0.0333395 | 0.0333373 | 0.03334513 | 0.0333396 |
| Issue4 | 0.02000099 | 0.020005 | 0.5237608 | 0.02000524 | 0.0200025 |
| Issue5 | 0 | 0 | 0.9307498 | 0 | 0 |

5—Identify Issues Relevant to Compliance, Depending on the Probability Distribution of the Extracted Keywords.

a. Define similarity criteria to relate issues to specific compliance requirements (e.g., issue A and compliance requirement B share same topics and similar probability distributions).

b. Retrieve relevant issues and their related compliance requirements. For instance, an exemplary correlation between issue and compliance requirements may be as detailed in Table 5 below. This issue is highly related to Topic 3. Above, it has been identified that requirements 3.2 and 3.4 are mainly about Topic 3, so this may mean the issue and these requirements are related too.

TABLE 5

| Issue | Dist Topic 1 | Dist Topic 2 | Dist Topic 3 | Dist Topic 4 | Dist Topic 5 |
|---|---|---|---|---|---|
| Issue5 | 0 | 0 | 0.9307498 | 0 | 0 | c. Store the correlations in a correlation mode (i.e. mapping information) between compliance requirements and files.

Part 2—Using Mapping Information to Identify Code Change Relevance to Compliance Requirements.

Inputs: a) PCI-DSS requirements; b) Source code files; c) Project issues; d) Compliance Keywords e) Code-requirements mapping information; f) Issue-requirements mapping information.

Outputs: i) Updated code-requirements mapping information; ii) Commit-requirements mapping information; iii) Compliance notifications to developers.

1. Given an issue from the ticketing system, retrieve relevant compliance information. Step 1 takes place when picking a software increment, at the beginning of the continuous delivery model.

a. Identify if the issue is compliance-relevant using the requirements-issues correlation model of the mapping information, and in affirmative case, retrieve the related compliance requirements. For example, the aforementioned "Issue5" issue.

b. Send a notification to the developer(s), including the correlated compliance requirements. For example: "This issue seems to be related to PCI-DSS requirements 3.2 and 3.4".

2. Given a file to be edited, retrieve relevant compliance information. Step 2 takes place when a developer starts editing any file, at the development stage.

a. Identify if the file to be edited is compliance-relevant using the requirements-files correlation model of the mapping information, and in affirmative case, retrieve the related compliance requirements. For example: the aforementioned "FileA" file.

b. Send a notification to the develop(s), including the correlated compliance requirements. Example: "This file seems to be related to PCI-DSS requirements 3.2 and 3.4".

3. After committing changes, extract compliance keywords frequency from it and correlate to compliance requirements. Step 3 takes place when a developer commits the changes to the repository, at the commit stage.

a. Analyze changes for each individual file, using the compliance keyword model to correlate changes to compliance requirements.

b. Analyze commit comments, using the compliance keyword model to correlate changes to compliance requirements.

4. After committing changes, update existing keywords frequency for the involved files. This step takes place when a developer commits the changes to the repository, at the commit stage.

a. Analyze updated files, using the compliance keywords model to correlate changes to compliance requirements.

The exemplary implementation detailed above is just one of many possible implementations that may be employed to provide and use information linking source code to compliance requirements.

There are many other potential implementations that could also be used to map or associate source code elements to compliance requirements.

Figure 5:
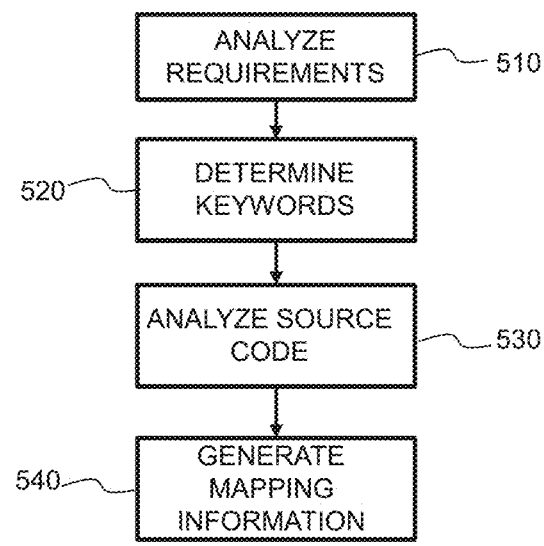
FIG. 5 is a flow diagram of a computer-implemented method for generating mapping information linking source code with compliance requirements, in accordance with embodiments of the present invention.

Referring now to FIG. 5, which is a flow diagram of a computer-implemented method for generating mapping information linking source code with compliance requirements, in accordance with embodiments of the present invention. The method begins with step 510 of analyzing a set of compliance requirements to identify one or more compliance topics. Here, the set of compliance requirements are pre-processed to remove predetermined words and characters. Also, by way of example, the step 510 of analyzing the set of compliance requirements comprises: processing the set of compliance requirements in accordance with a natural language processing algorithm to identify topic words; determining a frequency of occurrence of each identified topic word in the set of compliance requirements; and then determining the one or more compliance topics based on the determined frequency of occurrence of each identified topic word.

Next, in step 520, keywords for the identified one or more compliance topics are determined. As above, this may comprise employing predetermined heuristics, or techniques, to extract keywords from the compliance topic(s) and identify their associated probability distributions.

In step 530, an item of source code (such as a source code file, or source code extract) is analyzed to identify occurrences of the keywords in the source code. In this example, such analysis initially undertakes pre-processing of the source code to remove predetermined words and characteristics. After such pre-processing is completed, the item of source code in processed in accordance with a natural language processing algorithm to identify occurrences of the keywords.

Finally, step 540 comprises generating mapping information representing a relationship between the item of source code and the compliance requirements based on the identified occurrences of the keywords. The mapping information may define an association between an item of source code and one or compliance requirements, and this may comprise a plurality of mapping entries each detailing a keyword occurrence and the compliance requirements) the keyword occurrence relates to.

Figure 6:
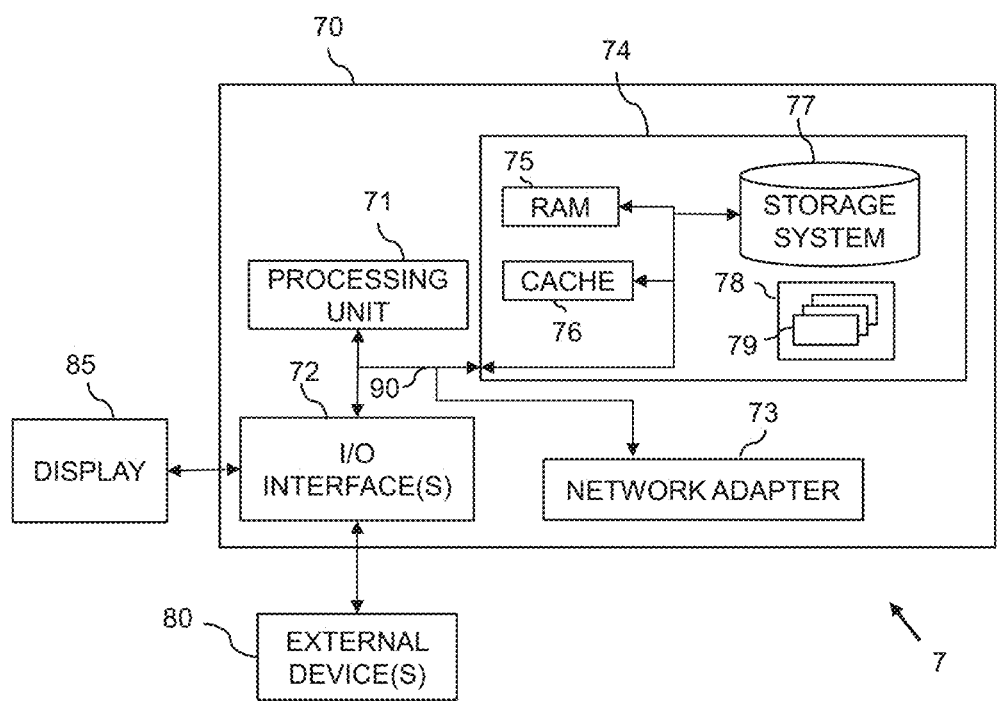
FIG. 6 is a block diagram of a computer system, which may form part of a networked system, in accordance with embodiments of the present invention.

By way of further example, as illustrated in FIG. 6, embodiments may comprise a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM) a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although his disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability as some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It ay be managed by the organization or a third party and may exist on-premises or off-premises.

Community cloud: the cloud infrastructure is shared by several organizations and supports a specific community that has shared concerns mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
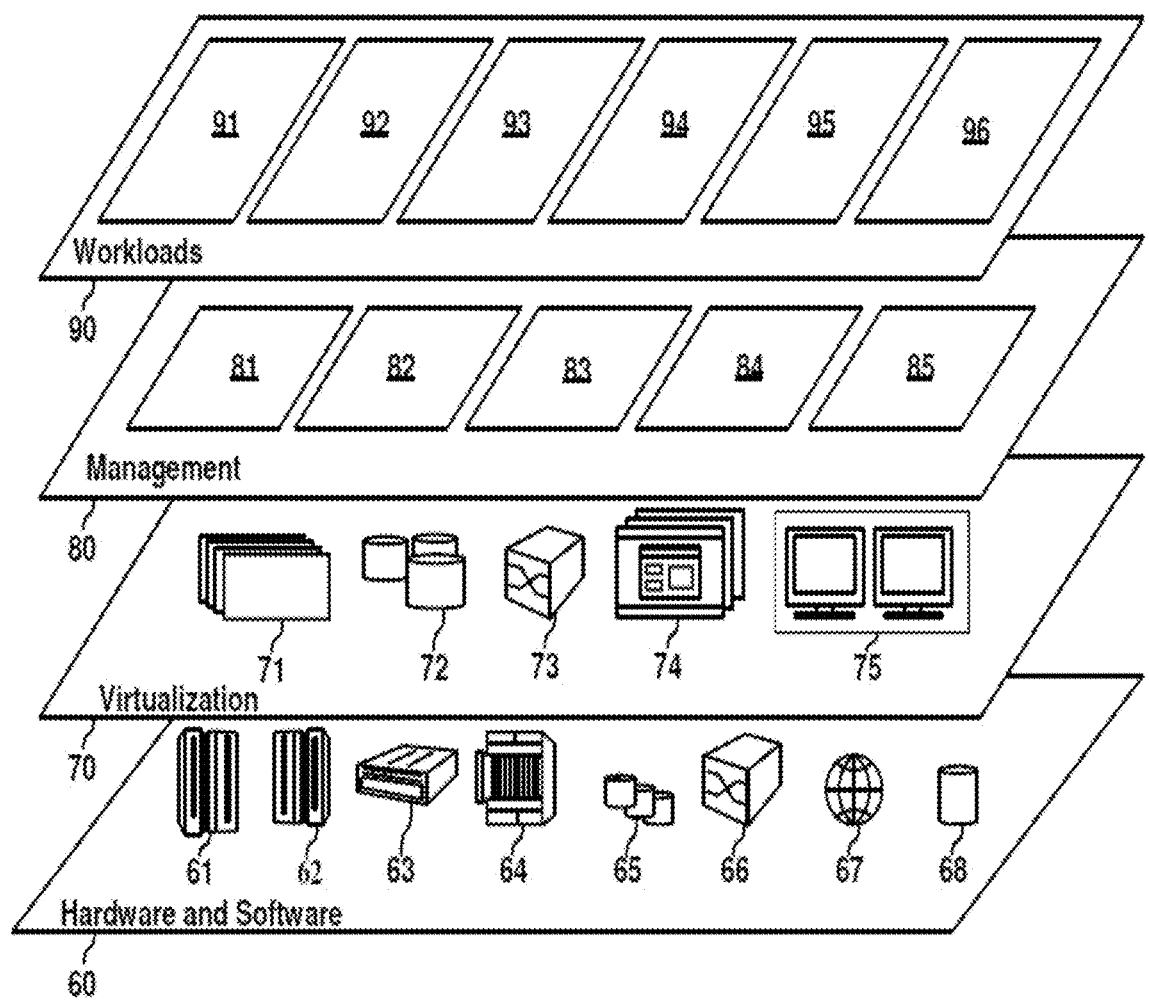
FIG. 7 depicts a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
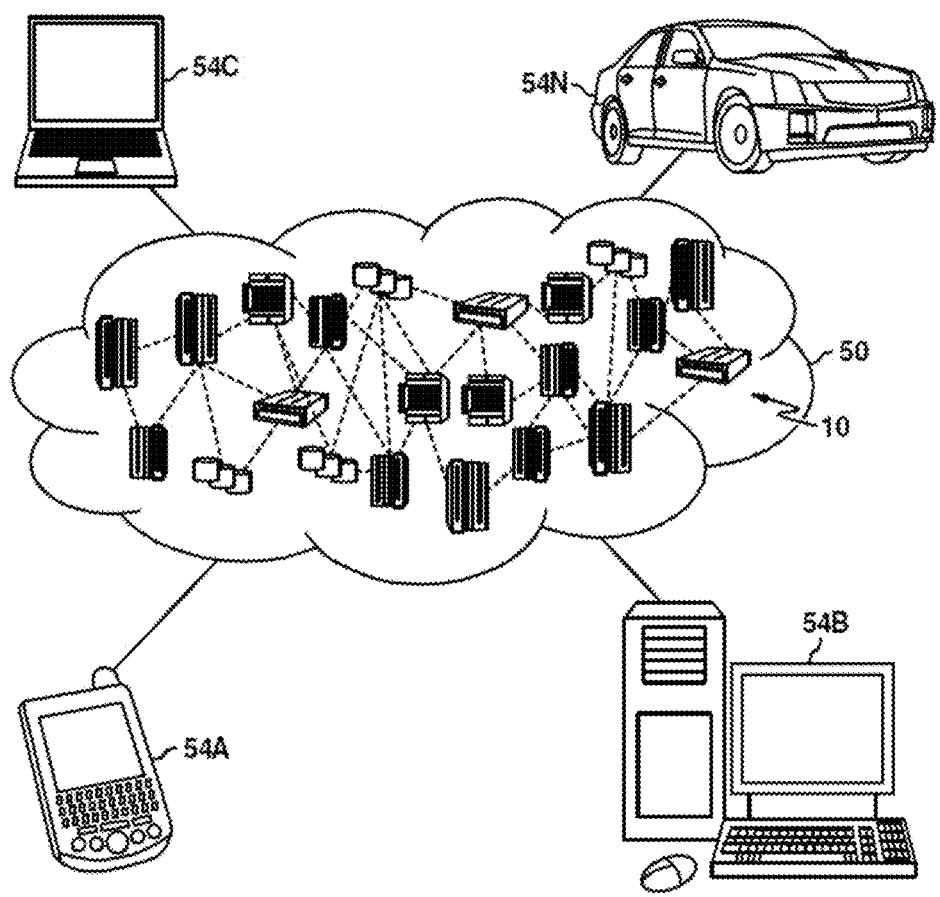
FIG. 8 depicts abstraction model layers, in accordance with embodiments of the present invention.

Referring now to FIG. 8, a set of functional abstraction layers provided by cloud computing environment 50 (see FIG. 7) are shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and source code change identification 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating mapping information linking source code with regulatory compliance requirements, the method comprising:

analyzing, by a processor of a computing system, a set of regulatory compliance requirements to identify one or more regulatory compliance topics, the analyzing including employing, by the processor, a natural language processing algorithm, wherein the analyzing further includes:
  processing, by the processor, the set of regulatory compliance requirements in accordance with the natural language processing algorithm to identify topic words,
  determining, by the processor, a frequency of occurrence of each identified topic word in the set of regulatory compliance requirements, and
  determining, by the processor, one or more regulatory compliance topics based on the determined frequency of occurrence of each identified topic word;
extracting, by the processor, keywords for the identified one or more regulatory compliance topics by employing the natural language processing algorithm;
identifying, by the processor, a probability distribution of the keywords extracted from the set of regulatory compliance requirements;
analyzing, by the processor, an item of source code to identify occurrences of the keywords in the source code;
generating, by the processor, mapping information representing a relationship between the item of source code and the regulatory compliance requirements based on the identified occurrences of the keywords; and
detecting, by the processor, an impact of the item of source code in a continuous delivery model based on the relationship between the item of source code and the regulatory compliance requirements, wherein, as a function of the detecting, prompting, by the processor, a code developer to take an action to alter the item of source code so as to meet the regulatory compliance requirements.

2. The method of claim 1, further comprising:
for each of the keywords, determining, by the processor, a weighting value representing a relative importance of the keyword, wherein the step of generating mapping information is further based on the determined weighting values.

3. The method of claim 2, wherein determining a weighting value for a keyword comprises:
  determining, by the processor, a frequency of occurrence of the keyword in the regulatory compliance documents; and
  calculating, by the processor, a weighting value for the keyword based on the determined frequency of occurrence.

4. The method of claim 1, wherein generating mapping information comprises:
  for each identified occurrence of a keyword, defining, by the processor, a model entry associating the occurrence of the keyword with the regulatory compliance topic it is a keyword for.

5. The method of claim 1, wherein step of analyzing Di the set of regulatory compliance requirements comprises:
  pre-processing, by the processor, the set of regulatory compliance requirements to remove predetermined words and characters.

6. The method of claim 1, wherein step of analyzing an item of source code comprises:
  pre-processing, by the processor, the source code to remove predetermined words and characteristics.

7. The method of claim 1, wherein step of analyzing an item of source code comprises:
  processing, by the processor, the item of source code in accordance with a natural language processing algorithm to identify occurrences of the keywords.

8. A computer program product, comprising a computer readable hardware storage device storing a computer readable program code, the computer readable program code comprising an algorithm that when executed by a computer processor of a computing system implements a method for generating mapping information linking source code with regulatory compliance requirements, the method comprising:
  analyzing, by a processor of a computing system, a set of regulatory compliance requirements to identify one or more regulatory compliance topics, the analyzing including employing, by the processor, a natural language processing algorithm, wherein the analyzing further includes:
    processing, by the processor, the set of regulatory compliance requirements in accordance with the natural language processing algorithm to identify topic words,
    determining, by the processor, a frequency of occurrence of each identified topic word in the set of regulatory compliance requirements, and
    determining, by the processor, one or more regulatory compliance topics based on the determined frequency of occurrence of each identified topic word;
  extracting, by the processor, keywords for the identified one or more regulatory compliance topics by employing the natural language processing algorithm;
  identifying, by the processor, a probability distribution of the keywords extracted from the set of regulatory compliance requirements;
  analyzing, by the processor, an item of source code to identify occurrences of the keywords in the source code;
  generating, by the processor, mapping information representing a relationship between the item of source code and the regulatory compliance requirements based on the identified occurrences of the keywords; and
  detecting, by the processor, an impact of the item of source code in a continuous delivery model based on the relationship between the item of source code and the regulatory compliance requirements, as a function of the detecting, prompting, by the processor, a code developer to take an action to alter the item of source code so as to meet the regulatory compliance requirements.

9. A processing system comprising at least one processor and the computer program product of claim 8, wherein the at least one processor is adapted to execute the computer program code of said computer program product.

10. A computer system for generating mapping information linking source code with regulatory compliance requirements, wherein the system comprises:
  a processor;
  a memory device coupled to the processor; and
  a computer readable storage device coupled to the processor, wherein the storage device contains program code executable by the processor via the memory device to implement a method for facilitating usage of a software program on a computing system, the method comprising:
    analyzing, by a processor of a computing system, a set of regulatory compliance requirements to identify one or more regulatory compliance topics, the analyzing including employing, by the processor, a natural language processing algorithm, wherein the analyzing further includes:
processing, by the processor, the set of regulatory compliance requirements in accordance with the natural language processing algorithm to identify topic words,
determining, by the processor, a frequency of occurrence of each identified topic word in the set of regulatory compliance requirements, and
determining by the processor, one or more regulatory compliance topics based on the determined frequency of occurrence of each identified topic word;
extracting, by the processor, keywords for the identified one or more regulatory compliance topics by employing the natural language processing algorithm;
identifying, by the processor, a probability distribution of the keywords extracted from the set of regulatory compliance requirements;
analyzing, by the processor, an item of source code to identify occurrences of the keywords in the source code;
generating, by the processor, mapping information representing a relationship between the item of source code and the regulatory compliance requirements based on the identified occurrences of the keywords; and
detecting, by the processor, an impact of the item of source code in a continuous delivery model based on the relationship between the item of source code and the regulatory compliance requirements, wherein, as a function of the detecting, prompting, by the processor, a code developer to take an action to alter the item of source code so as to meet the regulatory compliance requirements.

11. The system of claim 10, further comprising:
determining a weighting value representing a relative importance of the keyword, and
generating mapping information representing a relationship between the item of source code and the regulatory compliance requirements further based on the determined weighting values.

12. The system of claim 11, further comprising determining a frequency of occurrence of the keyword in the compliance documents, and to calculate a weighting value for the keyword based on the determined frequency of occurrence.

13. The system of claim 10, further comprising:
for each identified occurrence of a keyword, defining a model entry/element associating the occurrence of the keyword with the compliance topic it is a keyword for.

14. The system of claim 10, further comprising pre-processing the set of regulatory compliance requirements to remove predetermined words and characters.

15. The system of claim 10, further comprising processing the item of source code in accordance with the natural language processing algorithm to identify occurrences of the keywords.

* * * * *